Nov. 7, 1944.  A. W. BAIRD  2,361,918
ELECTRIC WELDING APPARATUS
Filed Dec. 18, 1942  3 Sheets-Sheet 1
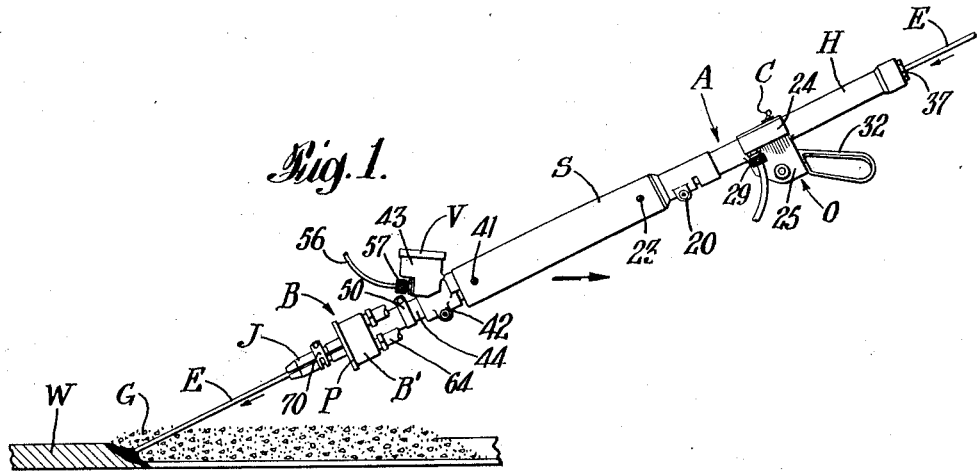
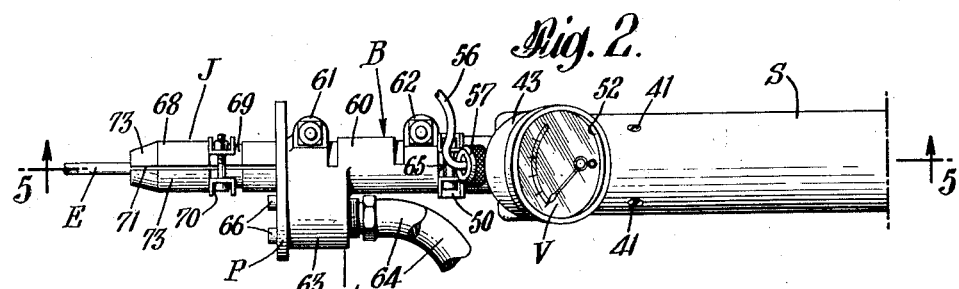
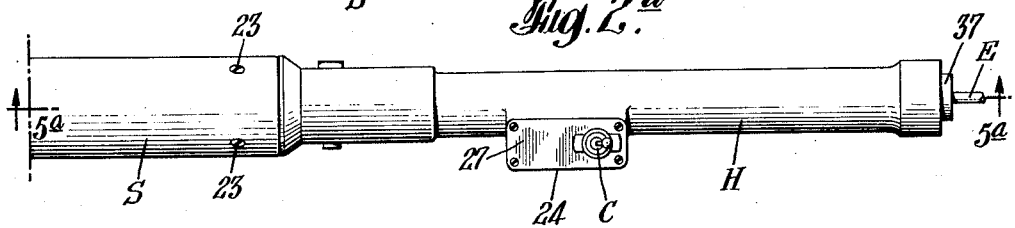
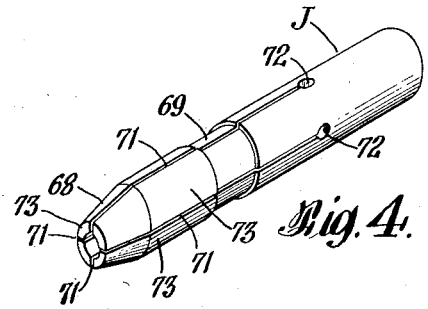
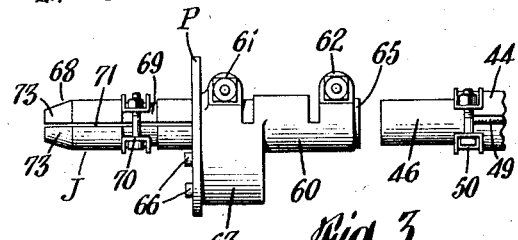
INVENTOR
ALBERT W. BAIRD
BY
ATTORNEY

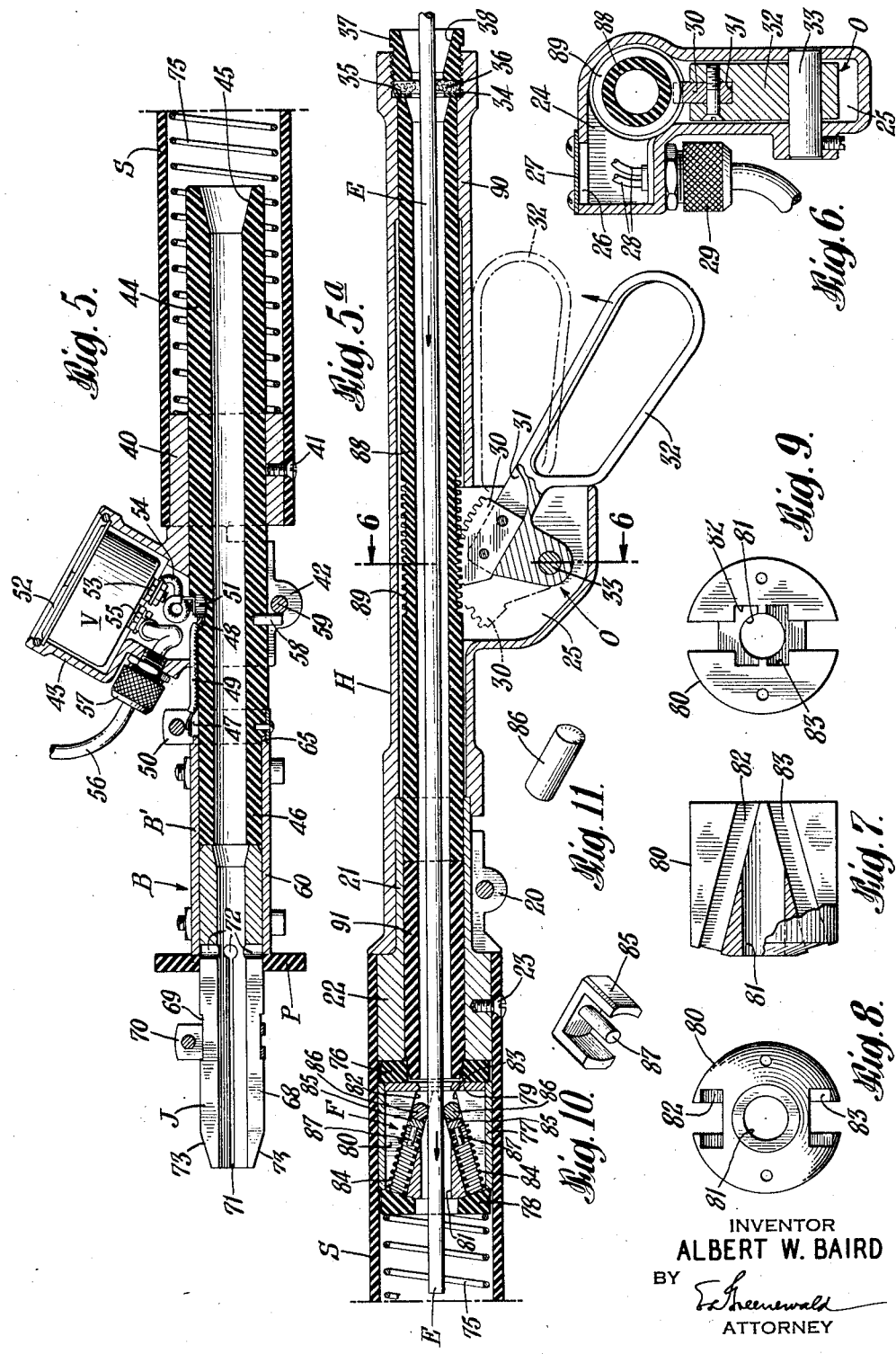

Nov. 7, 1944. A. W. BAIRD 2,361,918
ELECTRIC WELDING APPARATUS
Filed Dec. 18, 1942 3 Sheets-Sheet 3
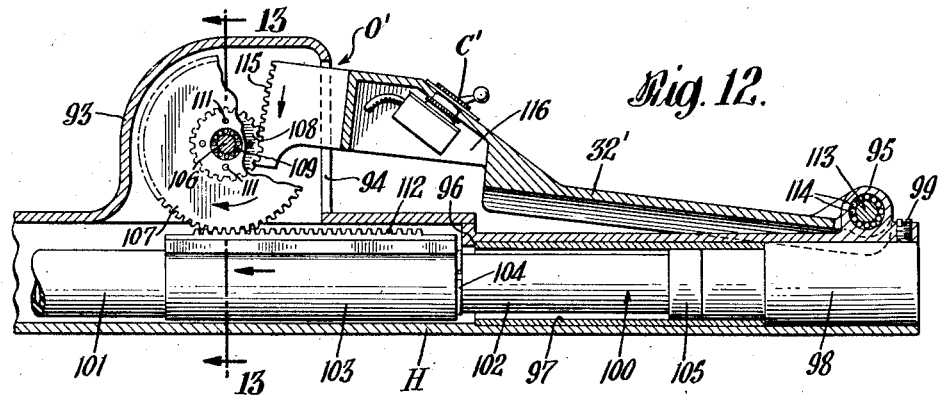
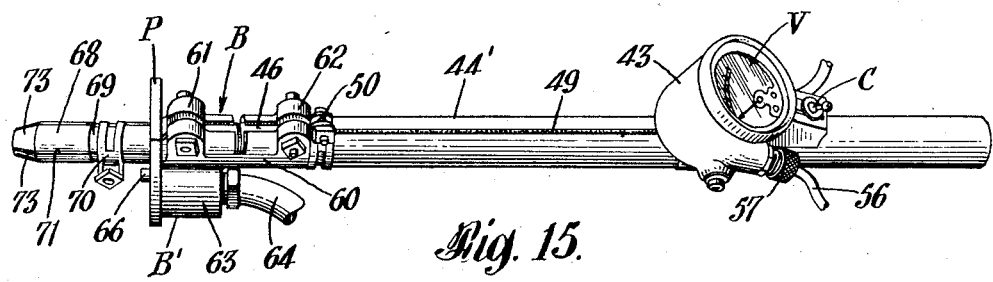
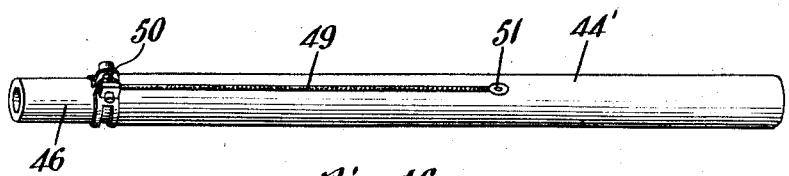
INVENTOR
ALBERT W. BAIRD
BY
ATTORNEY Patented Nov. 7, 1944

2,361,918

UNITED STATES PATENT OFFICE 2,361,918

ELECTRIC WELDING APPARATUS

Albert W. Baird, Cranford, N. J., assignor to The Linde Air Products Company, a corporation of Ohio Application December 18, 1942, Serial No. 469,395

5 Claims. (Cl. 314—57)

This invention relates to electric welding apparatus and more particularly to a manually operated welding rod or electrode feeding mechanism.

There is disclosed in Patent No. 2,043,960, issued June 9, 1936, on application of Lloyd T. Jones, Harry E. Kennedy, and Maynard A. Rotermund jointly, a method of electric welding wherein a seam between the opposing edges of objects or work to be welded is overfilled with a welding composition free from gas-forming ingredients, in powdered or granular form, and an electric welding current is passed from an electrode or welding wire to the work through the welding composition into which the fusing end of the electrode is inserted. During the welding operation, as the electrode is fed to the work and simultaneously translated along the seam through the welding composition, part of the latter is locally fused at successive portions of the seam, and molten metal of the electrode is deposited in the seam and coalesced with the fused edges of the seam to provide a uniformly strong weld. An excess of unfused welding composition is maintained as a blanket over the welding zone.

This method has heretofore been practiced principally by machines using welding heads which feed the electrode automatically as the welding progresses. In all such machines there is relative translatory movement between the work and the welding head. The excellent quality of welds produced by this method of welding, as well as other considerations, makes it desirable that the process be made available for use in applications in which installation of automatic welding machinery would be inconvenient or impractical. Portable equipment has been developed which may be used in some of such applications, but even this equipment does not completely satisfy the demand which exists for broadening the field of use of this method of welding.

In particular, portable or hand welding equipment hitherto used has not been capable of handling the relatively large diameter welding rods and relatively heavy welding currents essential to the efficient use of the Jones et al. electric welding process.

In Patent No. 2,275,910, issued March 10, 1942, in the name of Harry E. Kennedy, there is disclosed a manual electric welding method, using portable or hand welding equipment, in which the welding composition of the above Jones et al. patent is heaped on the work and the fusing end of an electrode or welding rod is inserted into the composition. The fusing tip of the electrode, which is covered by the welding composition, is maintained at the proper distance from the work by holding the electrode at an acute angle to the work and observing the welding voltage as indicated by suitable means such as a voltmeter. The voltage is maintained substantially constant by varying either the pressure with which the electrode is forced into the welding composition or the angle at which the electrode is directed toward the work. This latter is accomplished by pivoting the electrode about the unfused welding composition as a fulcrum.

It is among the objects of this invention to provide a portable or manually operated welding electrode feeding mechanism which is adapted to handle large sizes of welding electrodes; to provide such a mechanism with which the distance between the end of the welding electrode and the work may be easily maintained at a substantially uniform value; to provide such a mechanism including improved means for conducting relatively large electric welding currents to the welding electrode as it is advanced through the mechanism toward the work to be welded; to provide such a mechanism including means for readily indicating to the operator the distance between the fusing end of the welding electrode and the work; to provide such a mechanism in which all the necessary controls are suitably grouped at a position convenient of access to the operator; to provide such a mechanism including a novel electrode feeding clutch means for advancing the electrode toward the work; to provide such a mechanism which is readily adjustable in length and usable with various sizes of electric welding electrodes; and to provide such a mechanism which is simple in construction, economical to manufacture, and efficient in operation.

These and other objects of the invention will in part be obvious and in part become apparent from the following description and accompanying drawings, in which:

Fig. 1 is an elevation view of the portable welding apparatus of the present invention in operative relation with the work to be welded;

Figs. 2 and 2a, when aligned longitudinally, are a plan view of the apparatus shown in Fig. 1;

Fig. 3 is an elevation view of a bus bar assembly forming part of the present invention;

Fig. 4 is a perspective view of a welding nozzle or contact jaw forming part of the bus bar assembly of Fig. 3;

Fig. 5 is a longitudinal view, partly in section, taken on the line 5—5 of Fig. 2 and looking in the direction of the arrows;

Fig. 5a is a longitudinal view, partly in section, taken on the line 5a—5a of Fig. 2a and looking in the direction of the arrows;

Fig. 6 is a transverse sectional view taken on the line 6—6 of Fig. 5a and looking in the direction of the arrows;

Figs. 7, 8 and 9 are, respectively, a cut-away view, a front view and a rear view of an element of a welding rod feeding mechanism forming part of the present invention;

Figs. 10 and 11 are perspective views of a roller aligning block and a roller, respectively, adapted to be used with the element illustrated in Figs. 7, 8 and 9;

Fig. 12 is a longitudinal sectional view illustrating part of a modified form of portable welding apparatus embodying the principles of the present invention;

Fig. 13 is a transverse sectional view taken on the line 13—13 of Fig. 12 and looking in the direction of the arrows; and Figs. 14, 15 and 16 are perspective views of sub-assemblies of the welding apparatus of the present invention.

Generally speaking, the welding apparatus of the present invention comprises an elongated handle assembly to the forward end of which is secured a bus bar assembly for conducting electric current to a welding rod or electrode mounted in the handle assembly. A reciprocable rod feeding means, slidably mounted in the handle assembly, upon movement in one direction, is adapted to grip the welding rod and advance it toward the work, and, upon movement in the reverse direction, to release the welding rod. A welding rod nozzle or contact jaw, forming part of the bus bar assembly, grips the welding rod upon reverse movement of the feeding means to prevent reverse movement of the rod. A remote control switch for the welding current is conveniently mounted upon the handle assembly adjacent an operating means for the welding and feeding means. In order that the operator may maintain the welding voltage, and hence the distance between the fusing end of the electrode and the work to be welded, a voltmeter is mounted on the handle assembly in such a position that its indications are readily visible to the operator during a welding operation.

Referring more particularly to Figs. 1 through 11 of the drawings, the embodiment of the invention therein illustrated comprises an elongated handle assembly A on the forward end of which is mounted a bus bar assembly B including a bus bar B' and a contact jaw or nozzle J. An insulating guard plate P is mounted on the assembly B and extends outwardly therebeyond. A welding rod or electrode E is advanced toward the work W to be welded by means of a feeding means F slidably mounted in handle assembly A and reciprocated longitudinally of assembly A by an operating means O. On movement of feeding means F in one direction, rod E is advanced toward the work, and, on movement of feeding means F in the opposite direction, rod E is restrained against movement by contact jaw J, all as more fully described hereinafter. A remote control switch C for the welding current is mounted adjacent operating means O and a voltmeter V is mounted on handle assembly A adjacent bus bar assembly B.

The handle assembly A includes a generally tubular, elongated metal handle H secured to one end of a sleeve S of insulating material, and the bus bar assembly B is secured to the other end of sleeve S. At its forward end, handle H is formed with a split clamp portion 20 adapted to detachably receive a reduced tubular extension 21 formed on a bushing 22 secured by screws 23 in the rear end of sleeve S. Intermediate its ends, handle H is formed with perpendicularly related offset housings 24 and 25. Housing 24 has an opening 26 closed by a removable cover plate 27 on which is mounted control switch C. Conductors 28 are brought into housing 24 through an entrance bushing 29, and are connected at one end to switch C and at the other end to a welding current master switch (not shown). A gear segment 30, secured in a recess 31 in an operating handle 32, is mounted in housing 25 on a pin 33, and forms part of the feeding means operating means O. At its rear end, handle H is formed with an enlarged and threaded recess 34 in which is inserted an annular plate 35 and a felt washer 36 both held in position by an entrance bushing 37 of insulating material threadedly mounted in recess 34. Entrance bushing 37 is formed with an outwardly flared opening 38 to receive welding rod E.

A bushing 40 is secured by screws 41 in the forward end of sleeve S and is formed with a split clamp portion 42 and a voltmeter housing 43. The split clamp portion 42 detachably receives the intermediate portion of an elongated tube 44 of insulating material, formed with a flaring opening 45 at its rearward end and a reduced section 46 at its forward end. A groove 47 is formed in tube 44 and extends from a point adjacent reduced section 46 to a recess 48, and receives a conductor 49 connected at one end to a metal clamp 50 and at the other end to a terminal 51 in recess 48.

The voltmeter V is retained in housing 43 by a split retaining ring 52, and one terminal 53 of the voltmeter is connected by conductor 54 to terminal 51. The other terminal 55 of the voltmeter receives a conductor 56, brought into housing 43 through entrance bushing 57, and adapted to be connected at its opposite end (not shown) to the work W to be welded. Voltmeter housing 43 is properly positioned on tube 44 by a pin 58 engaging a bolt 59 in the clamp portion 42 of bushing 40.

The bus bar assembly B is secured to the reduced section 46 of tube 44, and comprises bus bar B', insulating guard plate P and contact jaw or nozzle J. Bus bar B' comprises a central cylindrical portion 60, split clamps 61 and 62, and a cable terminal block 63, on the forward clamp 61, formed to receive welding current cables 64. The rear end of split clamp 62 is reduced in diameter at 65 to fit beneath and have electrical contact with clamp 50. Split clamp 62 detachably secures the bus bar assembly to tube 44.

Guard plate P is secured by bolts 66 to the forward face of terminal block 63 and extends outwardly beyond the terminal block 63 and split clamp 61, which latter detachably secures bus bar B' to contact jaw or nozzle J.

Nozzle or jaw J is a generally tubular member of copper or some other suitable electrically conductive material. The forward end 68 of the nozzle is turned down to form a frusto-conical portion, and intermediate its ends the jaw is formed with a circumferential recess 69 receiving a clamp 70. A plurality of slots 71, preferably four in number, extend longitudinally of nozzle J from the forward end thereof to points rearwardly of recess 69, where each slot terminates in a circular aperture 72. The described construction provides the forward end of the jaw or nozzle with flexible gripping fingers 73, for a purpose to be described.

The feeding means or mechanism F is slidably mounted in the sleeve S, and is moved in one direction by operating means O and in the other by a spring 75. As the feeding mechanism is in electrical contact with the welding rod, an insulating plate 76 is disposed between the rear end of the feeding mechanism and bushing 22.

Mechanism F comprises a sleeve 77 fitting closely in sleeve S, apertured end plates 78 and 79, and a cylindrical block 80, all united by suitable fastening means into a single cartridge or unit. Block 80 is formed with an axial bore or passage 81 at least larger in diameter than the largest size of electrode to be handled by the apparatus. At its rear end, bore 81 is intersected by rearwardly converging bores or passages 82 and 83, which preferably are substantially rectangular in cross section. Bores 82 and 83 receive springs 84, roller aligning blocks 85 and rollers 86. Blocks 85 are C-shaped and have a cross section similar to that of bores or passages 82 and 83. Each block includes a pin 87 to receive one of the springs 84 which also abut end plate 78. For a purpose to be described hereinafter, springs 84 normally urge blocks 85 and rollers 86 rearwardly and inwardly toward bore 81 which receives electrode or rod E.

In the embodiment of the invention shown in Figs. 1 through 6, the operating means O for the feeding mechanism includes a tube 88 slidably mounted in handle H and provided with rack teeth 89 which mesh with gear segment 30. Handle H is formed with an inner shoulder 90 which acts as a guide for the rear end of tube 88 and the forward end of the tube 88 is guided in bushing 22, where it abuts the rear end of a tube 91. The forward end of tube 91 is tapered and has a wedge fit in insulating plate 76. When operating handle 32 is pivoted toward handle H to its dotted line position in Fig. 5a, gear segment 30 moves the tubes 88 and 91 and rod feeding mechanism F forwardly. Upon release of operating handle 32, spring 75 moves the feeding mechanism F and tubes 88 and 91 rearwardly, causing handle 32 to pivot outwardly to its full line position in Fig. 5a.

An alternative form of operating means or mechanism O' is illustrated in Figs. 12 and 13. In this form, the handle H' is formed with an offset housing 93 having an opening 94, and with spaced apertured ears 95. An internal shoulder 96 is formed in handle H, and a bushing 97 abuts this shoulder and is held in place by a second bushing 98 having a reduced forward end extending into bushing 97. Bushing 98 is retained in position by a set screw 99. A tube 100, having a forward section 101 larger in diameter than its rearward section 102, has mounted thereon a rack 103 which abuts the shoulder formed by the junction of sections 101 and 102 and is held in place by a split ring 104 seated in a groove in section 102. A collar 105 seated on the latter section abuts the forward end of the reduced section of bushing 97 to limit the rearward movement of tube 100. The section 102 of tube 100 slides in bushing 98.

A pin 106 extends between the side walls of housing 93, and spur gears 107 and 108 are mounted thereon on roller bearings 109. A washer 110 separates large gear 107 from small gear 108 and the gears and washer are united to form a unit by rivets 111. The teeth of spur gear 107 mesh with the teeth 112 on rack 103.

A pin 113 is mounted on roller bearings 114 in the apertured ears 95, and an operating handle 32' is secured to the pin and extends forwardly through opening 94 into housing 93. Rack teeth 115 on handle 32' mesh with small spur gear 108. Intermediate its ends, handle 32' is formed with a housing 116 for a welding current remote control switch C'. The remainder of operating mechanism O' is the same as operating mechanism O. When handle 32' is moved inwardly, its rack teeth 115 rotate gears 107 and 108 to move tube 100 forwardly; spring 75 moving the tube 100 rearwardly upon release of handle 32'.

The operation of the apparatus of the invention is as follows. The rod or electrode E is inserted in the entrance bushing 37 of handle H or in tube 100 in handle H', and is pushed through the apparatus until its forward end projects beyond contact jaw J. Clamp 70 on jaw J is tightened so that the flexible fingers 73 exert a gripping action on the electrode E. Conductor 56 is secured to the work by a suitable clamp so that, when switch C or C' is actuated to initiate the flow of welding current, voltmeter V will indicate the welding voltage.

When the operating means O or O' are actuated to move the feeding means F forwardly, the rollers 86 move rearwardly along passages 82 and 83 and inwardly toward electrode E under the influence of springs 84. Thereby, the rollers 86 grip the electrode E and the latter moves forwardly with the feeding mechanism. When the handles 32 or 32' are released, the spring 75 moves the feeding mechanism F rearwardly. The rollers 86 now move forwardly along passages 82 and 83 and outwardly away from the electrode. This is due to the gripping action of fingers 73 of jaw J which restrain rearward movement of rod E. Consequently, rollers 86 roll along rod E in such a direction that they move relatively forwardly and outwardly along passages 82 and 83 and do not exert a gripping action on the rod E. Hence, mechanism F acts as a "one-way" clutch and jaw J with its flexible fingers 73 constitutes means to restrain reverse movement of electrode or rod E.

In Fig. 1, the apparatus is illustrated in position to weld according to the method described and claimed in Kennedy Patent No. 2,275,910. A quantity of a granular fusible mineral welding material G is heaped on the work W to be welded and the fusing end of electrode E is submerged beneath the materal. The rod or electrode E is directed toward the work at an acute angle. As the axis of voltmeter V makes a substantially complementary acute angle with the axis of the electrode, the face of voltmeter V is substantially parallel to the work. Thus, the voltmeter indications are readily visible to the operator of the welding apparatus.

During the welding operation, the welding current melts and coalesces metal from the electrode and from the work and progressively fuses a portion of the welding material G. As described in the Kennedy patent, the fusing end of the electrode is maintained at a desired distance from the work by varying the pressure with which the electrode is forced against the material G and/or by pivotting the electrode E about the unfused portion of material G as a fulcrum. Desirably, the electrode E is firmly pressed into the welding material G to provide a steady control of the welding operation by pivotting movement of the apparatus. By observing the reading of voltmeter V, the welding voltage and hence the distance between the fusing end of rod E and the work can be maintained substantially constant. As the rod melts, the operating means O or O' may be actuated to cause mechanism F to advance the rod or electrode toward the work. By suitable manipulation of the pressure of the rod against material G, or preferably by suitable control of the pivoting of the rod about material G as a fulcrum, and by careful manipulation of operating means O and O', all in accordance with the indications of voltmeter V, an accurate control of the welding voltage, and hence of the distance between the end of rod E and work W, may be easily maintained.

While the apparatus of the present invention is primarily a rod feeding mechanism, portions of the apparatus, as shown in Figs. 14, 15 and 16, may be detached and used as electrode holders. Thus, Fig. 14 illustrates an electrode holding unit comprising voltmeter V, bus bar assembly B and tube 44. In Fig. 15, a longer tube 44' is illustrated. Both these units including the voltmeter V are well adapted to practice the method of Kennedy Patent No. 2,275,910, even though no feeding of the electrode relative to the holder is possible. Additionally, the longer tube 44' may be substituted for the tube 44 in the apparatus of Figs. 1 through 13 if it is desired to increase the overall length of the apparatus.

Fig. 16 illustrates how the larger tube 44' may be detached and used as a simple electrode holder. Obviously, the shorter tube 44 may be used alone in a similar manner. In all forms of the invention, relatively large diameter rods and relatively large welding currents may be efficiently handled.

While specific embodiments of the principles of the invention have been illustrated and described, it will be readily appreciated by those skilled in the art that the invention may be otherwise embodied within the scope of the principles thereof.

What is claimed is:

1. Welding rod feeding apparatus comprising, in combination, a tubular handle; a sleeve secured to said handle; a bus bar assembly secured to said sleeve; a member reciprocably mounted in said handle and adapted to receive a welding rod; a welding rod feeding mechanism slidably mounted in said sleeve and operatively associated with said member; manually operable means mounted on said handle and engaging said member, said means being operative to move said member and said mechanism in one direction; resilient means mounted in said sleeve and operative to move said mechanism and said member in the opposite direction; said mechanism, upon movement in one direction, being adapted to grip a welding rod and advance it toward the work to be welded, and, upon movement in the opposite direction, being adapted to move freely along said welding rod; and means restraining movement of said welding rod upon movement of said mechanism and said member in said opposite direction.

2. Welding rod feeding apparatus as claimed in claim 1, in which the last named means comprises a flexible current carrying contact jaw forming part of said bus bar assembly.

3. Welding apparatus as claimed in claim 1, in which said member comprises a tube formed with rack teeth and said means for moving said member and mechanism in one direction comprises a gear segment pivotally mounted on said housing and operatively associated with said rack teeth, and a handle for operating said gear segment.

4. Welding apparatus as claimed in claim 1, including a rack secured to said member; a first gear pivotally mounted on said housing and engaging said rack; a second gear secured to said first gear; a gear segment engaging said second gear; and means for rotating said gear segment to operate said gears to move said member in said one direction.

5. Electric welding apparatus comprising, in combination, an elongated tubular member formed with a threaded recess and an inner shoulder at one end, and a split clamp at the other end; a metallic bushing having a reduced extension fitting in the split clamp of said elongated tubular member; an apertured felt washer in said threaded recess; an entrance bushing securing said felt washer in said threaded recess; a sleeve of insulating material secured to said metallic bushing; a voltmeter housing formed with a bushing secured in the opposite end of said sleeve, said housing being formed with a split clamp; a first tube formed with rack teeth and slidably engaging the inner shoulder in said elongated tubular member and said metallic bushing; a second tube slidably disposed in said metallic bushing and engaging said first tube; a welding rod feeding mechanism slidably mounted in said sleeve and operatively associated with said second tube; an elongated tubular insulating member secured in the split clamp of said voltmeter housing; a bus bar assembly formed with a split clamp engaging said elongated tubular insulating member; a welding current carrying contact nozzle secured in the opposite end of said bus bar assembly; a plate of insulating material secured to said bus bar assembly and extending radially therebeyond; gear means having teeth meshing with said rack teeth, mounted on said elongated tubular member for moving said tubes and feeding mechanism in one direction; and resilient means urging said welding rod feeding mechanism and said tubes in a direction opposite to the direction in which the same are moved by said gear means.

ALBERT W. BAIRD.